(12) United States Patent
Weber et al.

(10) Patent No.: US 11,689,003 B2
(45) Date of Patent: Jun. 27, 2023

(54) WIRE STRIPPER

(71) Applicant: MILWAUKEE ELECTRIC TOOL CORPORATION, Brookfield, WI (US)

(72) Inventors: Andrew J. Weber, Cudahy, WI (US); Justin Miller, Milwaukee, WI (US); Josh Rowland, Milwaukee, WI (US); Paige Lincoln, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 690 days.

(21) Appl. No.: 16/554,668

(22) Filed: Aug. 29, 2019

(65) Prior Publication Data

US 2020/0076172 A1    Mar. 5, 2020

Related U.S. Application Data

(60) Provisional application No. 62/831,914, filed on Apr. 10, 2019, provisional application No. 62/724,944, filed on Aug. 30, 2018.

(51) Int. Cl.
*H02G 1/12* (2006.01)
(52) U.S. Cl.
CPC .................. *H02G 1/1226* (2013.01)
(58) Field of Classification Search
CPC .................................................. H02G 1/1226
USPC ................................................ 30/90.1–90.2
See application file for complete search history.

(56) References Cited

U.S. PATENT DOCUMENTS

| | | | |
|---|---|---|---|
| 1,725,114 | A | 8/1929 | Gelderen |
| 1,921,384 | A | 8/1933 | Crowell |
| 2,452,423 | A | 10/1948 | Bass |
| 2,687,560 | A | 8/1954 | Palley |
| 3,125,835 | A | 3/1964 | Crowl et al. |
| 3,346,949 | A | 10/1967 | Apa et al. |
| 3,447,180 | A | 6/1969 | Wasko |
| 3,554,243 | A | 1/1971 | Derose et al. |
| 3,596,540 | A | 8/1971 | Hooper et al. |

(Continued)

FOREIGN PATENT DOCUMENTS

| | | |
|---|---|---|
| CN | 1306664 C | 1/2003 |
| CN | 100553056 C | 4/2005 |

(Continued)

*Primary Examiner* — Omar Flores Sanchez
(74) *Attorney, Agent, or Firm* — Michael Best & Friedrich LLP (57) ABSTRACT

A wire stripper includes a housing and a bushing coupled to the housing and having a tooth engageable with a wire for stripping an insulation jacket therefrom. The wire stripper also includes a drive mechanism configured to rotate the bushing about a longitudinal axis. The wire stripper also includes a depth adjustment mechanism arranged in the housing along the longitudinal axis. The depth adjustment mechanism includes a depth stop member and a telescoping shaft to which the depth stop member is coupled. The telescoping shaft is configured to telescope within the housing as the depth stop member moves between a first position, in which a first distance is defined between the depth stop member and the tooth, and a second position, in which a second distance is defined between the depth stop member and the tooth. The first distance is greater than the second distance.

15 Claims, 8 Drawing Sheets

(56) References Cited

U.S. PATENT DOCUMENTS

| | | |
|---|---|---|
| 3,829,951 A | 8/1974 | Nagayama |
| 3,886,655 A | 6/1975 | Molnar |
| 3,990,331 A | 11/1976 | Matthews |
| 4,059,893 A | 11/1977 | Solury |
| 4,117,590 A | 10/1978 | Rapp |
| 4,317,279 A | 3/1982 | Smith et al. |
| 4,345,375 A | 8/1982 | Hayward |
| 4,379,665 A | 4/1983 | Hendershot et al. |
| 4,459,881 A | 7/1984 | Hughes, Jr. |
| 4,489,490 A * | 12/1984 | Michaels ............. H02G 1/1229 30/90.1 |
| 4,559,704 A | 12/1985 | Michael, III |
| 4,594,029 A | 6/1986 | Michael, III |
| 5,023,995 A | 6/1991 | Kaplan |
| 5,457,877 A | 10/1995 | McDermott |
| 5,511,305 A | 4/1996 | Garner |
| 5,749,270 A | 5/1998 | Bourbeau |
| 6,161,289 A | 12/2000 | Alexander |
| 6,381,850 B1 | 5/2002 | Warner |
| 6,397,474 B1 | 6/2002 | Losinger |
| 6,510,610 B2 | 1/2003 | Losinger |
| 6,530,152 B1 | 3/2003 | Christensen et al. |
| 6,637,101 B2 | 10/2003 | Hathaway et al. |
| 6,640,439 B2 | 11/2003 | Losinger |
| 6,668,458 B1 | 12/2003 | Schoenleber |
| 6,731,218 B2 | 5/2004 | Luebke et al. |
| 6,844,819 B2 | 1/2005 | Luebke et al. |
| 6,926,473 B2 | 8/2005 | Luebke |
| 7,293,362 B2 | 11/2007 | Konen |
| 7,295,130 B2 | 11/2007 | Luebke et al. |
| 7,468,674 B2 | 12/2008 | Onachilla et al. |
| 7,565,740 B2 | 7/2009 | Henningsen |
| 7,597,030 B2 | 10/2009 | Stepan et al. |
| 7,984,553 B1 | 7/2011 | Miller et al. |
| 7,984,556 B2 | 7/2011 | Konen |
| 8,468,688 B2 | 6/2013 | Montena et al. |
| 8,544,364 B2 | 10/2013 | Michaels |
| 8,578,820 B2 | 11/2013 | Wirth |
| 9,929,548 B2 * | 3/2018 | Troy ..................... H02G 1/1226 |
| 2004/0221456 A1 | 11/2004 | Losinger |
| 2005/0247460 A1 | 11/2005 | Luebke |
| 2007/0159739 A1 | 7/2007 | Onachilla et al. |
| 2010/0039279 A1 | 2/2010 | Luebke et al. |
| 2010/0064522 A1 | 3/2010 | Vaccaro |
| 2012/0192414 A1 | 8/2012 | Montena et al. |
| 2013/0074345 A1 * | 3/2013 | Zick ..................... H02G 1/1221 83/13 |
| 2014/0290036 A1 | 10/2014 | Swenson |
| 2017/0201055 A1 | 7/2017 | Trombley |
| 2018/0026429 A1 * | 1/2018 | Liversidge ........... H02G 1/1226 30/91.2 |
| 2018/0062362 A1 | 3/2018 | Muston |
| 2019/0393685 A1 * | 12/2019 | Sedlacek ............. H02G 1/1265 |

FOREIGN PATENT DOCUMENTS

| Country | Number | Date | Notes |
|---|---|---|---|
| CN | 101147305 B | 3/2008 | |
| CN | 102214888 A | 10/2011 | |
| CN | 202260077 U | 5/2012 | |
| CN | 102623871 A | 8/2012 | |
| CN | 202474719 U | 10/2012 | |
| CN | 202633842 U | 12/2012 | |
| CN | 202797586 U | 3/2013 | |
| CN | 103515873 A | 1/2014 | |
| CN | 203813343 U | 9/2014 | |
| CN | 105680377 A | 6/2016 | |
| CN | 105811328 A | 7/2016 | |
| CN | 205595706 U | 9/2016 | |
| CN | 106058744 A | 10/2016 | |
| CN | 106129777 A | 11/2016 | |
| CN | 205681029 U | 11/2016 | |
| CN | 205791264 U | 12/2016 | |
| CN | 106410697 A | 2/2017 | |
| CN | 106684768 B | 5/2017 | |
| CN | 106684771 A | 5/2017 | |
| CN | 206498140 U | 9/2017 | |
| CN | 107394694 A | 11/2017 | |
| CN | 206947868 U | 1/2018 | |
| CN | 107851978 A | 3/2018 | |
| DE | 7109938 U | 6/1971 | |
| DE | 7228575 U | 11/1972 | |
| DE | 2336542 B2 | 5/1974 | |
| DE | 7435781 U | 2/1975 | |
| DE | 2438854 C2 | 2/1976 | |
| DE | 3135648 A1 | 3/1983 | |
| DE | 3935987 A1 | 5/1991 | |
| DE | 29622571 U1 | 3/1997 | |
| DE | 202007014210 U1 | 12/2007 | |
| DE | 202011000779 U1 | 10/2011 | |
| DE | 102011001757 A1 | 1/2012 | |
| EP | 0101191 B1 | 2/1984 | |
| EP | 1271730 B1 | 1/2003 | |
| EP | 1525958 A1 | 4/2005 | |
| EP | 1825277 | 8/2007 | |
| EP | 2434596 A1 | 3/2012 | |
| EP | 2854245 A2 * | 4/2015 | ........... F16K 31/122 |
| EP | 1867022 B1 | 11/2016 | |
| EP | 3269014 | 1/2018 | |
| WO | WO 9938636 | 8/1999 | |
| WO | WO 2006060428 A1 | 6/2006 | |
| WO | WO 2006062733 A1 | 6/2006 | |
| WO | WO 2006100590 A1 | 9/2006 | |
| WO | WO 2008011517 A1 | 1/2008 | |
| WO | WO 2010031020 A1 | 3/2010 | |
| WO | WO 2011123827 A2 | 10/2011 | |
| WO | WO 2016141415 A1 | 9/2016 | |
| WO | WO 2017120462 A1 | 7/2017 | |

* cited by examiner

WIRE STRIPPER

CROSS-REFERENCE TO RELATED APPLICATIONS

This application claims priority to U.S. Provisional Patent Application No. 62/831,914 filed on Apr. 10, 2019, and U.S. Provisional Patent Application No. 62/724,944, filed on Aug. 30, 2018, the entire contents of both of which are incorporated herein by reference.

FIELD OF THE INVENTION

The present invention relates to wire strippers, and more particularly to depth adjustment mechanisms and coupling members for wire strippers.

BACKGROUND OF THE INVENTION

Wire strippers include depth adjustment mechanisms to adjust the length of the insulation jacket to be stripped from the wire.

SUMMARY OF THE INVENTION

The present invention provides, in one aspect, a wire stripper comprising a housing and a bushing coupled to the housing and having a tooth engageable with a wire for stripping an insulation jacket therefrom. The wire stripper further comprises a drive mechanism configured to rotate the bushing about a longitudinal axis. The wire stripper further comprises a depth adjustment mechanism arranged in the housing along the longitudinal axis. The depth adjustment mechanism includes a depth stop member and a telescoping shaft to which the depth stop member is coupled. The telescoping shaft is configured to telescope within the housing as the depth stop member moves between a first position, in which a first distance is defined between the depth stop member and the tooth, and a second position, in which a second distance is defined between the depth stop member and the tooth. The first distance is greater than the second distance.

The present invention provides, in another aspect, a wire stripper assembly comprising a first bushing for stripping a wire of a first size. The first bushing has a first color. The wire stripper assembly further comprises a second bushing for stripping a wire of a second size that is different than the first size. The second bushing has a second color that is different than the first color. The wire stripper assembly further comprises a chart indicating that the first color corresponds to the first size and the second color corresponds to the second size. The wire stripper further comprises a wire stripper including a housing and a drive mechanism. The first bushing and the second bushing are alternately coupled to the housing for rotation by the drive mechanism. Each of the first and second bushings has a tooth engageable with a wire for stripping an insulation jacket therefrom.

The present invention provides, in yet another aspect, a wire stripper comprising a housing and a bushing coupled to the housing and having a tooth engageable with a wire for stripping an insulation jacket therefrom. The bushing defines a longitudinal axis. The wire stripper further comprises a drive mechanism configured to rotate the bushing about the longitudinal axis. The drive mechanism includes a motor defining a rotation axis that is not coaxial with the longitudinal axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
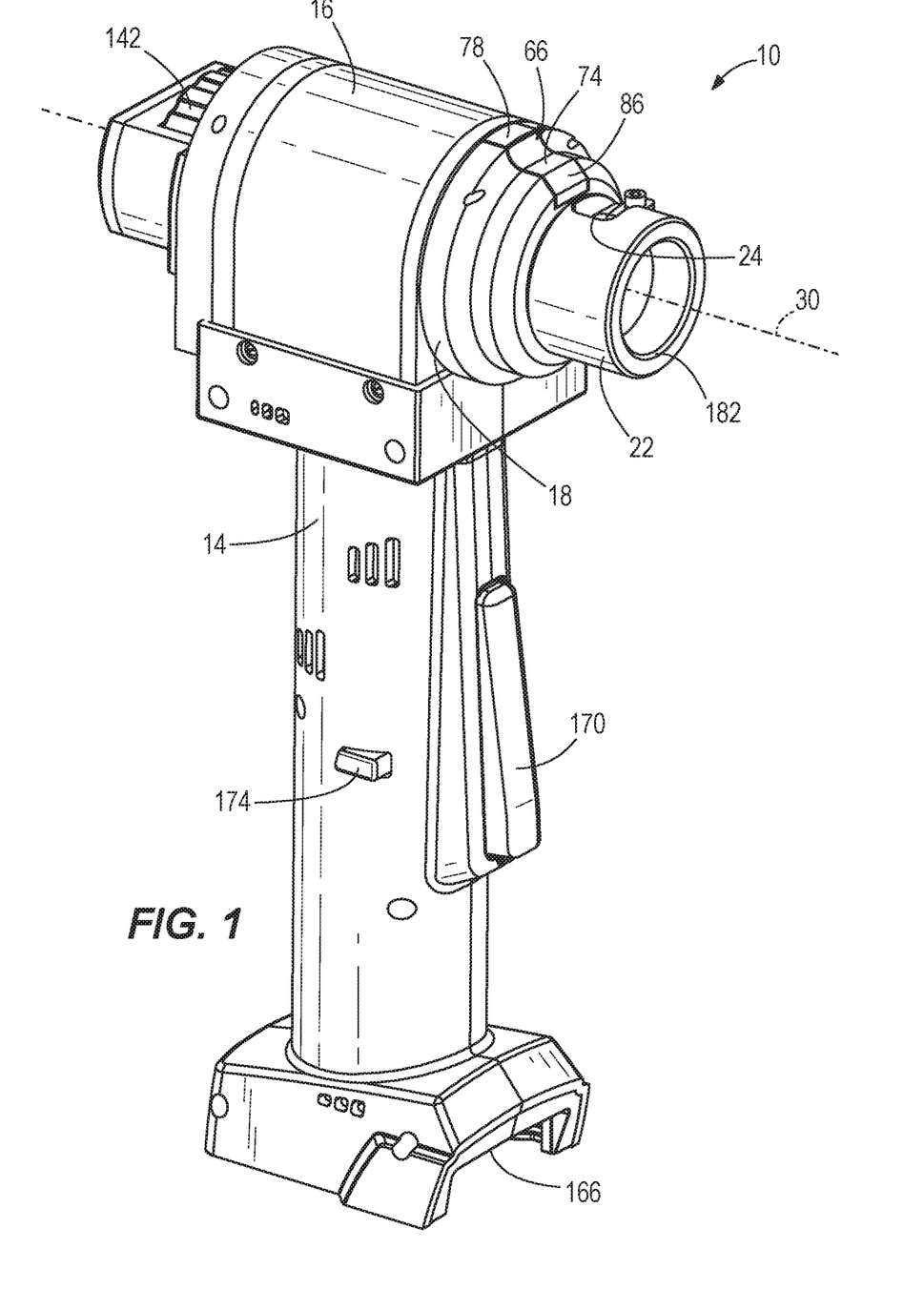
FIG. 1 is a perspective view of a wire stripper in accordance with an embodiment of the invention.
Figure 2:
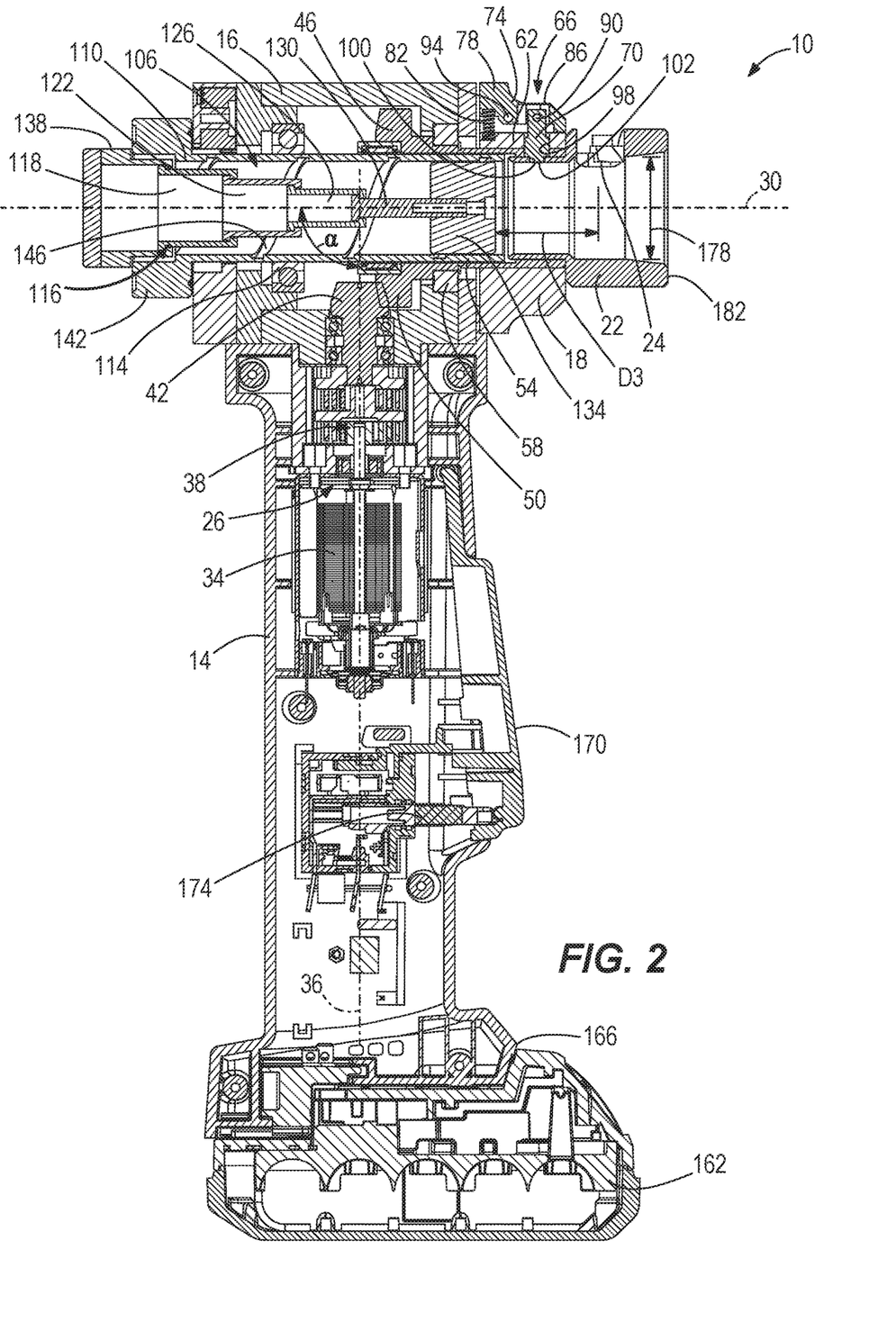
FIG. 2 is a cross-sectional view of the wire stripper of FIG. 1, illustrating a depth adjustment mechanism.

As shown in FIGS. 1 and 2, a wire stripper 10 includes a housing 14 having a main body 16 and a rotatable coupling member 18 that removably receives a first bushing 22 having a tooth 24 for stripping the insulation jacket from a wire (not shown). The wire stripper 10 also includes a drive mechanism 26 for rotating the coupling member 18 and the first bushing 22 with respect to the main body 16 about a longitudinal axis 30 defined by the coupling member 18. As shown in FIG. 2, the drive mechanism 26 includes a motor 34 having a rotation axis 36, a transmission 38 terminating in a bevel pinion 42, and a drive member 46. The drive member 46 includes a ring gear 50 that is engaged by the bevel pinion 42 and an integral collar 54 rotatably supported within the housing 14 by a bearing 58. The rotation axis 36 of the motor 34 is not coaxial with the longitudinal axis 30. Specifically, the rotation axis 36 of the motor 34 is arranged at an angle α with respect to the longitudinal axis 30. In the illustrated embodiment, the angle α is 90 degrees. In some embodiments, the angle α is 20 degrees. In some embodiments, the angle α is 45 degrees. In some embodiments, such as the embodiment schematically shown in FIG. 9, the rotation axis 36 of the motor 34 is parallel to the longitudinal axis 30, and thus the angle α is 0 degrees.

Figure 8:
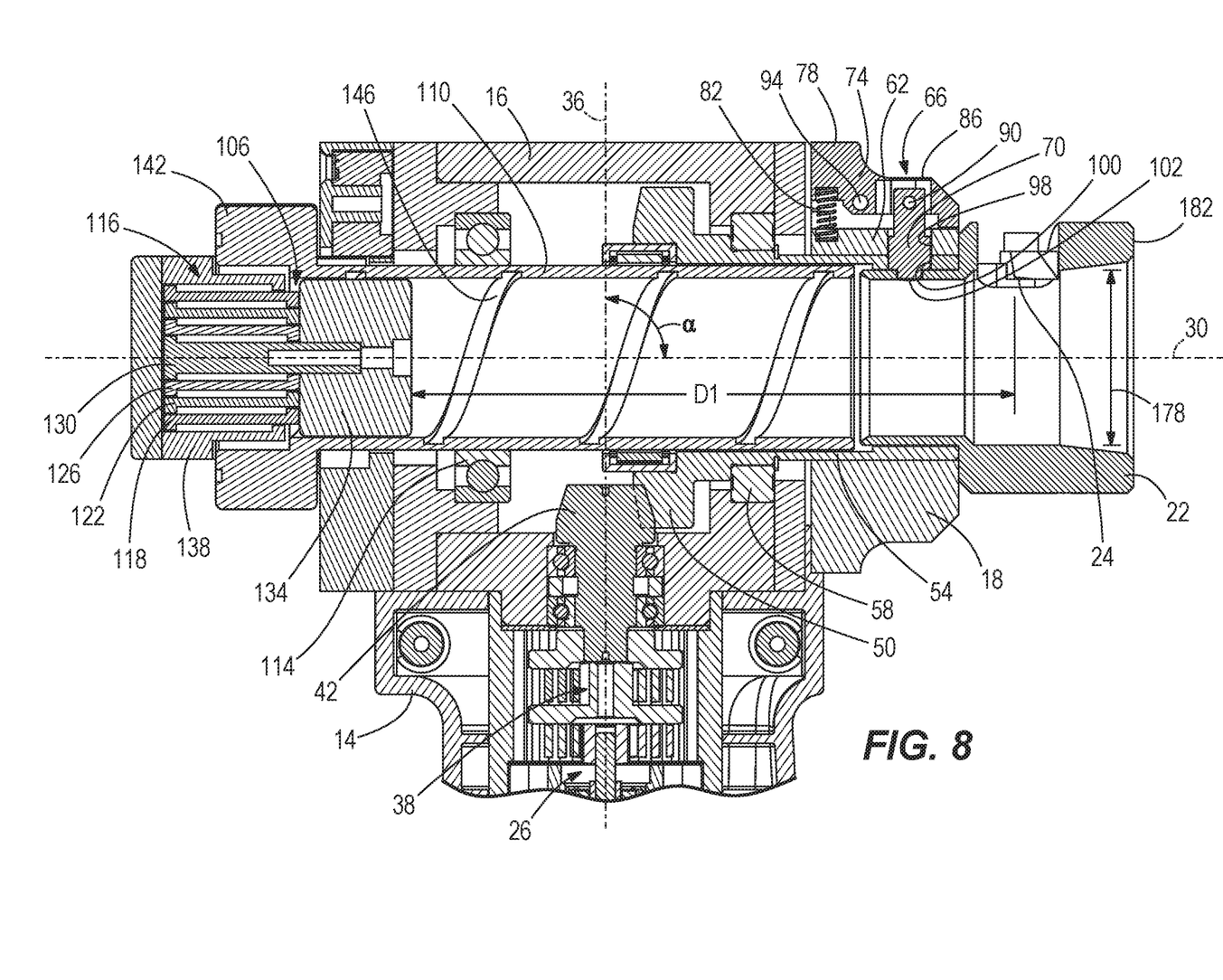
FIG. 8 is an enlarged cross-sectional view of the wire stripper of FIG. 1, illustrating the depth stop member in the first position.

As shown in FIGS. 2 and 8, the coupling member 18 has a body 62 that is coupled to the collar 54, such that the coupling member 18 is coupled for co-rotation with the drive member 46. The coupling member 18 also includes a quick release mechanism 66 to facilitate securing and removing the first bushing 22 to and from the coupling member 18. The quick release mechanism 66 includes a retainer 70 moveable between a first, locked position shown in FIGS. 2 and 8, in which the first bushing 22 is secured for co-rotation with the coupling member 18, and a second, unlocked position (not shown), in which the first bushing 22 is not secured for rotation with the coupling member 18 and is removable therefrom. The quick release mechanism 66 also includes an actuator 74 including a first end 78 that is biased away from the body 62 by a compression spring 82. The retainer 70 is coupled to a second end 86 of actuator 74 via a pivot 90.

The actuator 74 is pivotable with respect to the body 62 about a pivot 94. Because the first end 78 is biased away from the body 62, the second end 86 is biased towards the body 62, thus causing the retainer 70 to be biased toward the first position shown in FIGS. 2 and 8. The retainer 70 extends through a bore 98 in the body 62 and a bore 100 in the collar 54. As shown in FIG. 2, when the first bushing 22 is in the coupling member 18 and the retainer 70 is in the first position, the retainer 70 extends into an aperture 102 in the first bushing 22, such that the first bushing 22 is locked for rotation about the longitudinal axis 30 with the coupling member 22 and the drive member 46. When an operator moves the first end 78 of the actuator 70 toward the body 62 against the force of spring 82, the second end 86 moves away from body 62 and thereby lifts the retainer 70 into the second, unlocked position, in which the retainer 70 is removed from the aperture 102 of the first bushing 22. Thus, the first bushing 22 may be removed from the coupling member 18.

With reference to FIGS. 2-8, the wire stripper 10 also includes a depth adjustment mechanism 106 for adjusting a length of the wire along which an insulated jacket may be stripped therefrom. The depth adjustment mechanism 106 includes a tube 110, which is coaxial with the longitudinal axis 30, rotatably supported in the housing 14 by a bearing 114. The depth adjustment mechanism 106 also includes a telescoping shaft 116 having first, second, third and fourth telescoping members 118, 122, 126, 130 arranged within the tube 110 along the longitudinal axis 30, and a depth stop member 134 coupled to the fourth telescoping member 130. The depth adjustment mechanism 106 also includes a base 138 from which the telescoping members 118, 122, 126, 130, and thus the telescoping shaft 116, are able to telescope and a dial 142 coupled for rotation with the tube 110 with respect to the main body 16, such that when the dial 142 is rotated, the tube 110 rotates as well. In the illustrated embodiment, the telescoping shaft 116 has four telescoping members 118, 122, 126, 130 but in other embodiments the telescoping shaft 116 has more or fewer telescoping members.

Figure 3:
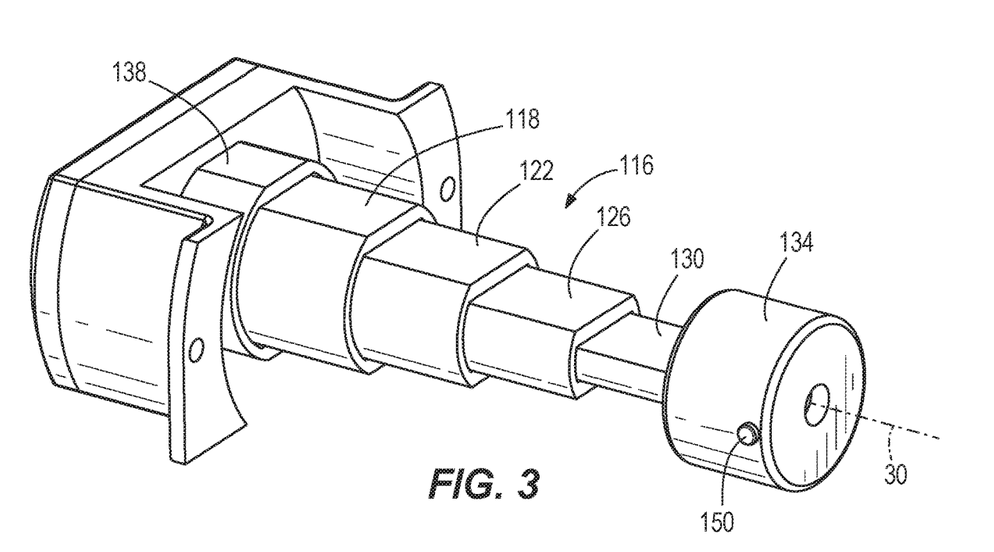
FIG. 3 is a perspective view of a portion of the depth adjustment mechanism of the wire stripper of FIG. 1.
Figure 4:
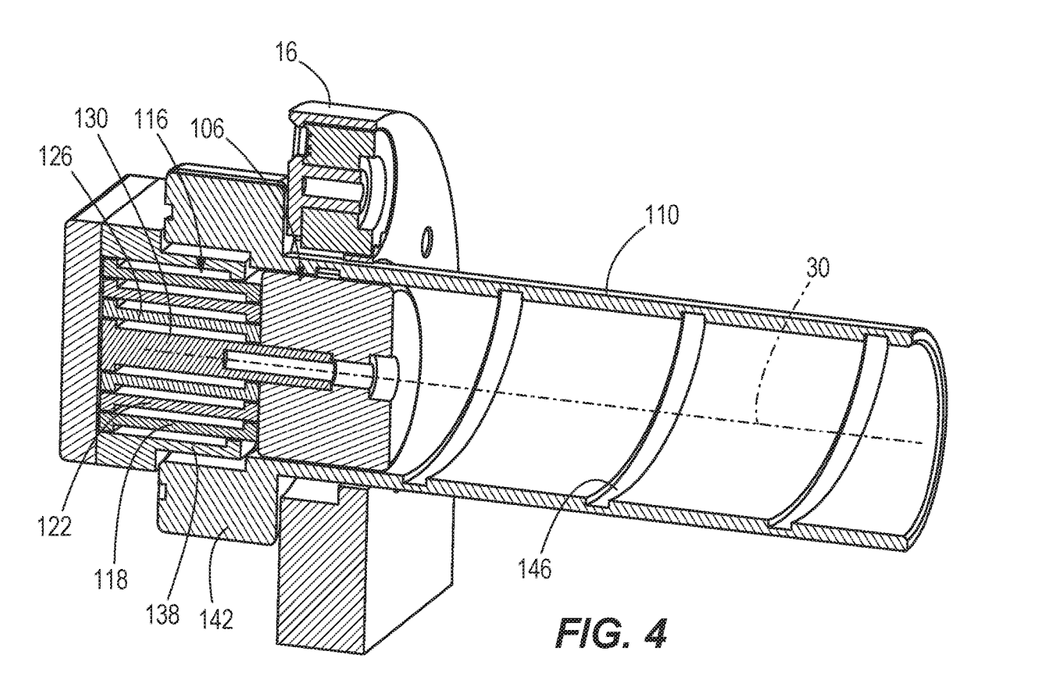
FIG. 4 is a cross-sectional view of the depth adjustment mechanism of the wire stripper of FIG. 1, with a depth stop member in a first position.

As shown in FIGS. 2, 4-6 and 8, the tube 110 includes a helical flute 146 on the interior thereof, extending along the length of the tube 110. As shown in FIG. 3, the depth stop member 134 includes a key 150 that is arranged in the flute 146, such that when the tube 110 rotates about the longitudinal axis 30 relative to the telescoping members 118, 122, 126, 130 and the depth stop member 134, the key 150 moves along the flute 146. In this manner, the depth stop member 134 will be drawn, via the key 150, along the length of the tube 110, while the telescoping members 118, 122, 126, 130 telescope with respect to each other and the base 138 within the tube 110 to accommodate the movement of the depth stop member 134. Thus, the depth stop member 134 can be moved between at least a first position (FIGS. 4 and 8), in which a first distance D1 is defined between the depth stop member 134 and the tooth 24 of the first bushing 22, a second position (FIG. 5), in which a second distance is defined between the depth stop member 134 and the tooth 24, and a third position (FIGS. 2, 3 and 6), in which a third distance D3 is defined between the depth stop member 134 and the tooth 24. Once the tube 110 has stopped rotating, the depth stop member 134 is axially fixed in one of the first, second, or third positions, because the key 150 is arranged in the flute 146 and the telescoping shaft 116, which is also axially fixed once the tube 110 stops rotating, prevents the depth stop member 134 from being moved toward the base 138. In this manner, the depth stop member 134 provides an axial depth stop for the wire within the tube 110 during operation, as described in further detail below. In some embodiments, the depth adjustment mechanism 106 is omitted. In other words, the telescoping shaft 116, the base 138, and the dial 142 are omitted, such that the wire may pass all the way through the tube 110, thus permitting the wire to pass all the way through the wire stripper 10, providing an operator with greater variability in the length of wire that can be stripped.

Figure 5:
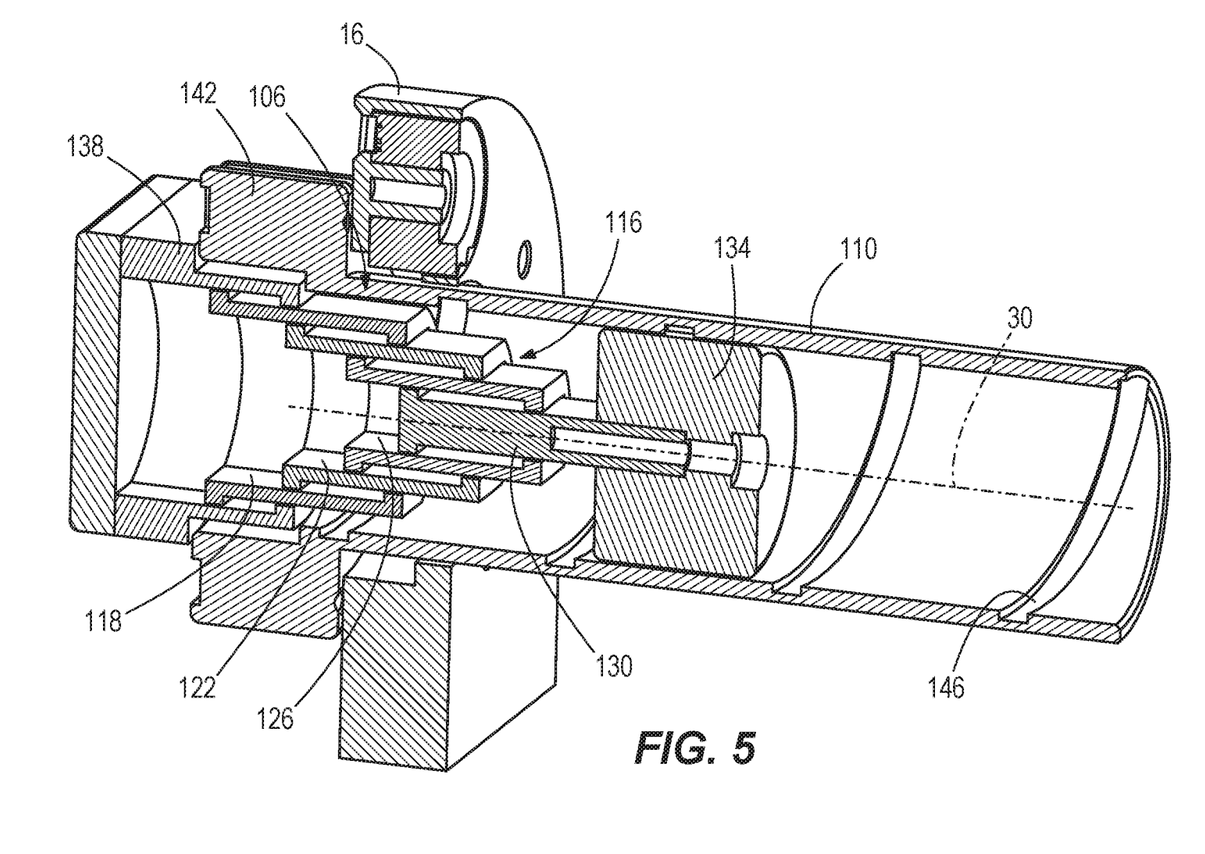
FIG. 5 is a cross-sectional view of the depth adjustment mechanism of the wire stripper of FIG. 1, with the depth stop member in a second position.
Figure 6:
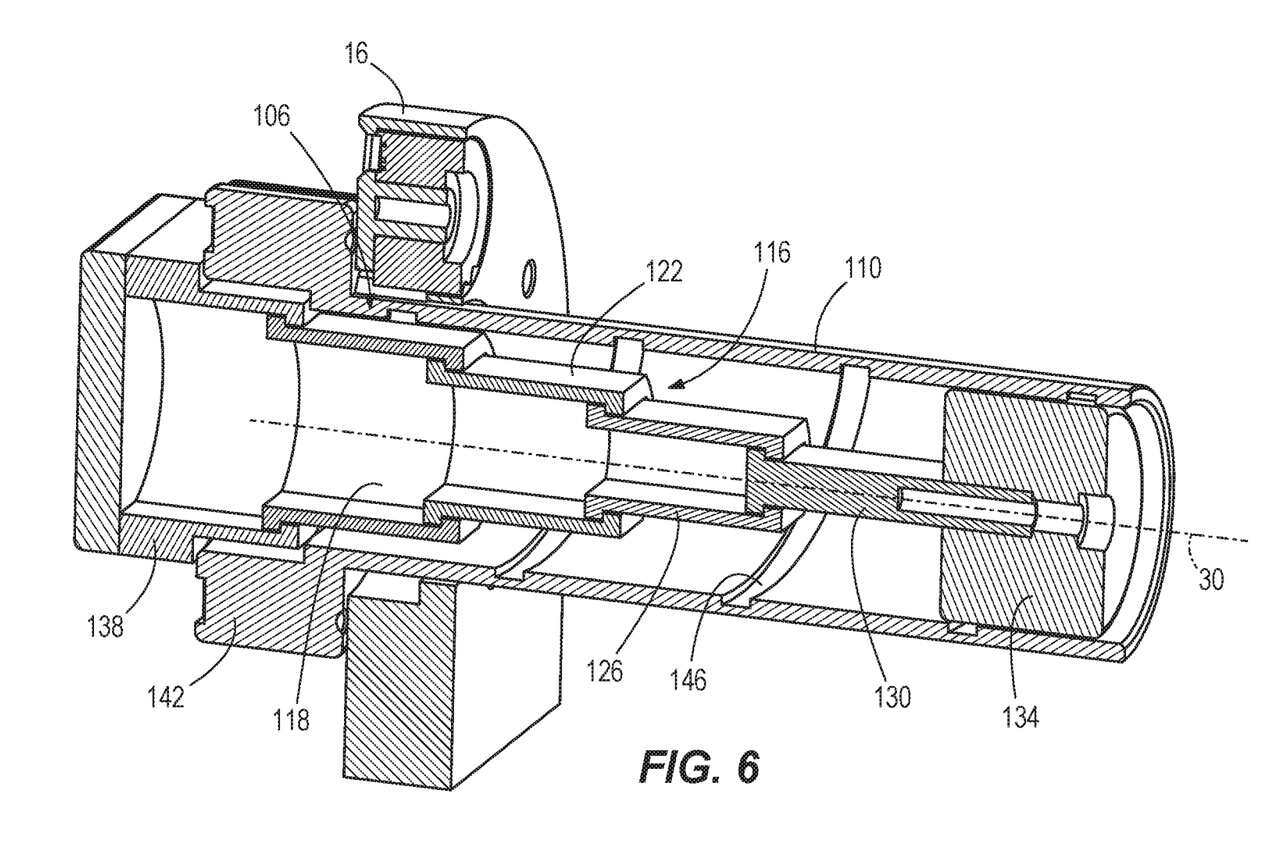
FIG. 6 is a cross-sectional view of the depth adjustment mechanism of the wire stripper of FIG. 1, with the depth stop member in a third position.

In operation, the wire is inserted through the first bushing 22, coupling member 18 and into the tube 110 until it abuts against the depth stop member 134. Thus, adjusting the depth stop member 134 within the tube 110 adjusts the length of the wire along which the insulated jacket is stripped. Accordingly, when the depth stop member 134 is in the first position (FIGS. 4 and 8), all of the telescoping members 118, 122, 126, 130 of the telescoping shaft 116 are telescoped within base 138, such that the first distance D1 is a maximum distance between the depth stop member 134 and the tooth 24, thus allowing an operator to strip a maximum length of insulated jacket from the wire. When the depth stop member 134 is in the third position (FIGS. 2, 3 and 6), all of the telescoping members 118, 122, 126, 130 of the telescoping shaft 116 are telescoped to a maximum extension position within tube 110, such that the third distance D3 is a minimum distance between the depth stop member 134 and the tooth 24, thus allowing an operator to strip a minimum length of insulated jacket from the wire. As shown in FIG. 5, when the depth stop member 134 is in the second position, the second distance is less than the first distance D1 and greater than the third distance D3, such that an operator can strip an intermediate length of insulated jacket from the wire.

Figure 7:
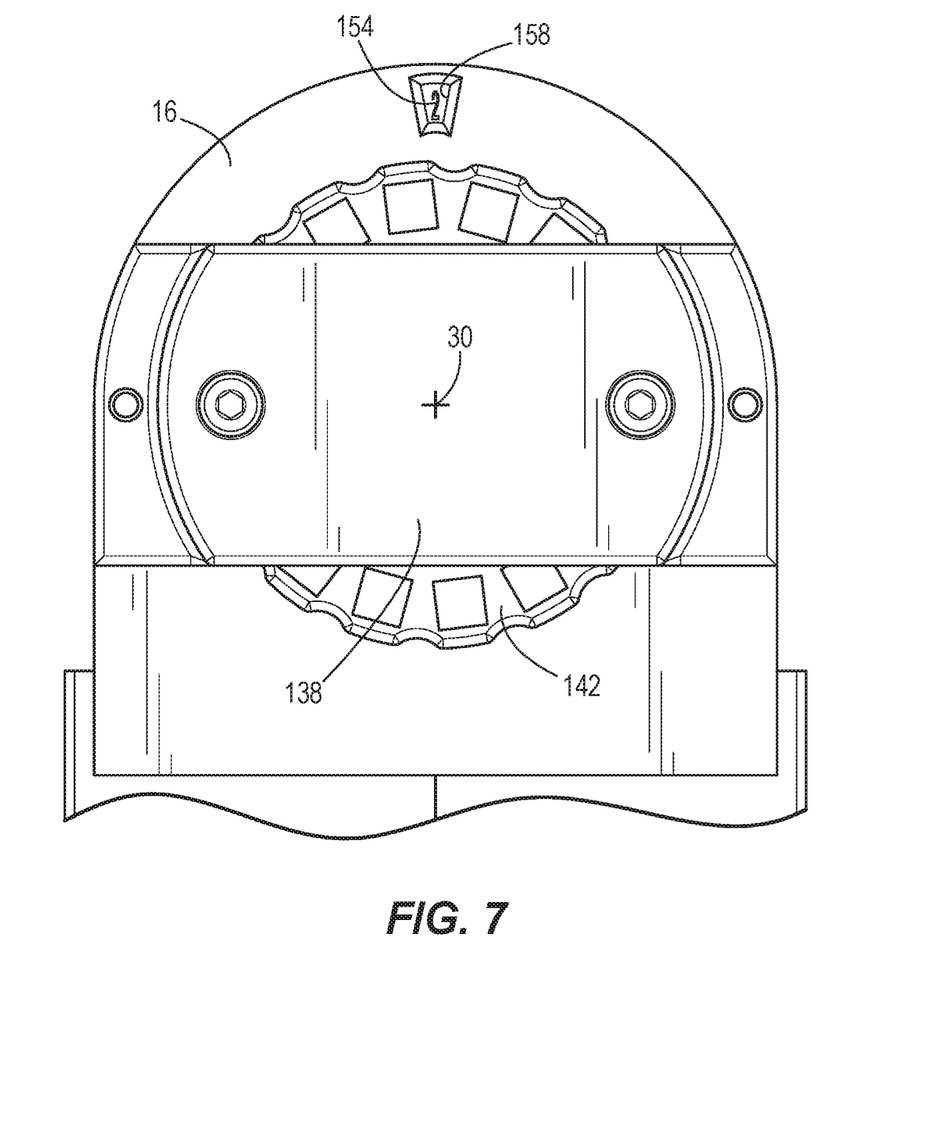
FIG. 7 is an enlarged, rear plan view of the wire stripper of FIG. 1.

As shown in FIG. 7, the dial 142 includes a first indicia 154 corresponding to the first position of the depth stop member 134 (and thus the first distance D1) and visible through a display 158 on the main body 16 of the housing 14. The dial 142 also includes a second indicia corresponding to the second position of the depth stop member 134 (and the second distance), and a third indicia corresponding to the third position of the depth stop member (and the third distance D3). Thus, when the dial 142 is rotated to a position in which the first indicia 154 is visible through the display 158, the rotation of tube 110 causes the depth stop member 134 to move to the first position. Likewise, when the dial 142 is rotated to a position in which the second indicia is visible through the display 158, rotation of the tube 110 causes the depth stop 134 to move to the second position, and when the dial 142 is rotated to a position in which the third indicia is visible through the display 158, rotation of the tube 110 causes the depth stop 134 to move to the third position. In some embodiments, the first 154, second and third indicia may all indicate different whole number lengths of measurement, such as inches, millimeters, or centimeters, corresponding to the length of wire to be stripped as dictated by the corresponding position of the depth stop 134. In some embodiments, the first 154, second, and third indicia indicate fractions of measurements, such as fractions of inches, corresponding to the length of wire to be stripped as dictated by the corresponding position of the depth stop 134. In another embodiment, the display 158 is electronic, such as a liquid crystal display (LCD). In some embodiments, the dial 142 includes detents to allow the dial 142 to be stopped at incremental rotational positions corresponding to, e.g., the first, second, and third positions of the depth stop 134. In some embodiments, more than three detents may be employed to provide more than three predetermined positions of the depth stop 134. In other embodiments, the depth stop 134 is adjustable anywhere along the length of the tube 110.

With reference to FIGS. 1 and 2, the wire stripper 10 further includes a battery pack 162 that can be mounted in a battery receptacle 166 coupled to the housing 14 to provide power to the motor 34. In some embodiments, the battery pack 162 is a rechargeable power tool battery pack. The wire stripper 10 also includes a switch 170 for actuating the motor 34 and a slider switch 174 for sliding between a forward rotation mode of the motor 34 and a reverse rotation mode of the motor 34.

In operation, an operator first decides what length insulated jacket is to be stripped from a first wire having a first diameter having a nominally smaller than an internal diameter 178 of the first bushing 22. For example, the operator may decide that a minimum length of insulated jacket should be stripped. Thus, the operator then rotates the dial 142 until the third indicia is visible through the display 158. Rotation of the dial 142 causes the tube 110 to rotate relative to the telescoping shaft 116 and the depth stop member 134. Thus, the key 150 of the depth stop member 134 is moved along the rotating helical flute 146 of the tube 110 until the depth stop member 134 is in the third position, such that the third, minimum, distance D3 is defined between the depth stop member 134 and the tooth 24 of the first bushing 22 (FIG. 2).

The operator then presses the switch 170, which actuates motor 34 to rotate the bevel pinion 42 via the transmission 38. Rotation of the bevel pinion 42 causes the drive member 46 to rotate via the ring gear 50, such that the collar 54 rotates relative to the tube 110. Rotation of the collar 54 causes rotation of the coupling member 18 and, because the retainer 70 is in the first position within the aperture 102 of the first bushing 22, the first bushing 22 is caused to rotate as well. The operator then gradually inserts the first wire through the first bushing 22, coupling member 18 and tube 110 until the wire abuts against the depth stop member 134, at which point the wire stops, because the depth stop member 134 is axially fixed in the third position. As the wire travels through the first bushing 22, coupling member 18 and into tube 110, the tooth 24 rotates about the insulated jacket of the wire, thereby making a continuous helical cut that strips the jacket from the wire. Once the first wire has reached the depth stop member 134, the minimum length of wire has been stripped, and the operator may remove the first wire from the wire striper 10, which causes the stripped jacket portion to also fall out.

Once the operator has finished with the first wire, the operator may decide that a second wire having a second, larger diameter than the first wire, needs to be stripped. Because the internal diameter 178 of the first bushing 22 is too small for the second wire, the operator needs to use a new, second bushing 180 (FIG. 10) having an internal diameter 184 that is greater than the internal diameter 178 of the first bushing 22. Thus, the operator presses the first end 78 of the actuator 74, causing the retainer 70 to move from the first position to the second position, in which the retainer 70 is moved out of the aperture 102 of the first bushing 22. The operator then removes the first bushing 22 from the coupling member 18 and inserts the second bushing 180 into the coupling member 18 until the retainer 70 is biased into the aperture 102 of the second bushing 180, thereby securing the second bushing 180 to the coupling member 18 and locking it for rotation therewith. Thus, the quick release mechanism 66 provides a fast and convenient means to allow an operator to quickly switch between first and second bushings 22, 180 having different internal diameters.

Figure 10:
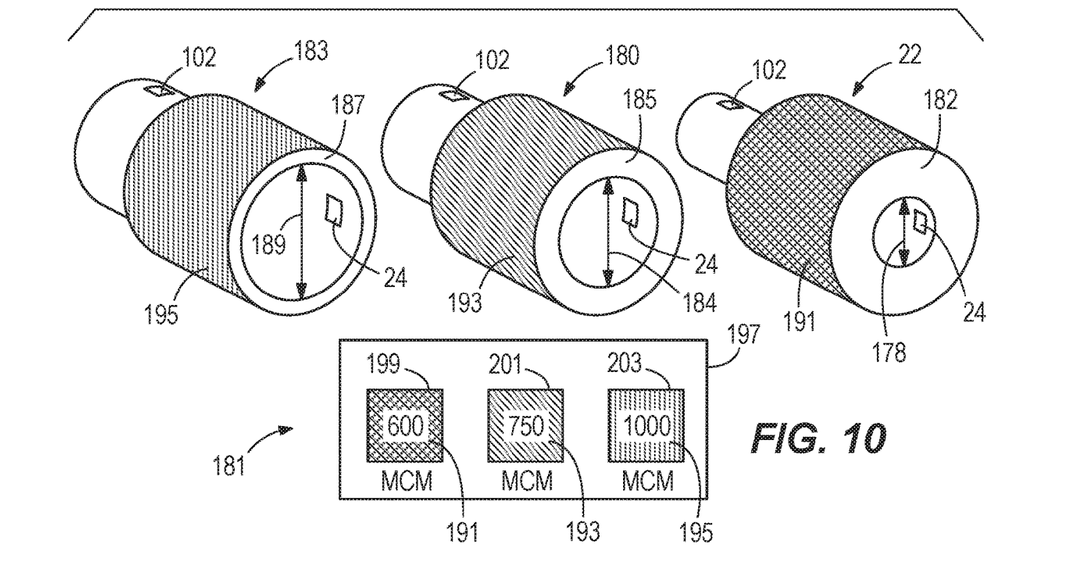
FIG. 10 is a perspective view of a kit for use with the wire stripper of FIG. 1.

In some embodiments, the first and second bushings 22, 180 may have different teeth or blades for stripping wire. In some embodiments, as shown in FIG. 10, a kit 181 includes the first bushing 22, the second bushing 180, and a third bushing 183, each of which is color coded or has other indicia to indicate what diameter wire the respective bushing is intended to strip. In some embodiments, the indicating color or indicia is located on a front face 182 of the first bushing 22, a front face 185 of the second bushing 180, and a front face 187 of the third bushing 183, making it easily visible to a user when the bushings 22, 180, 183 are in a typical bushing storage case. The third bushing 183 has a larger internal diameter 189 than the first and second internal diameters 178, 184. The first bushing 22 has a first color 191, the second bushing 180 has a second color 193, and the third bushing 183 has a third color 195, with each of the first, second, and third colors 191, 193, 195 being different from one another.

With continued reference to FIG. 10, the kit 181 also includes a chart 197 that helps an operator quickly identify which of the first, second, and third colors 191, 193, 195 correspond to first, second, and third wire sizes 199, 201, 203, such as 600, 750, and 1,000 MCM (thousands of circular mils). The first, second and third wire sizes 199, 201, 203 respectively correspond the to the first, second, and third internal diameters 178, 184, 189 of the first, second, and third bushings 22, 180, 183. In the illustrated embodiment, the first, second, and third wire sizes 199, 201, 203 are listed directly on boxes with the first, second, and third colors 191, 193, 195. Thus, with the chart 197, an operator can quickly select either the first, second, or third bushing 22, 180, 183 based on the color coding of the bushings 22, 180, 183 for what size wire needs to be stripped.

The operator then must decide what length insulated jacket is to be stripped from the second wire. For example, the operator may decide that a maximum length of insulated jacket should be stripped. Thus, the operator then rotates the dial 142 until the first indicia is visible through the display 158. Rotation of the dial 142 causes the tube 110 to rotate relative to the telescoping members 118, 122, 126, 130 and the depth stop member 134. Thus, the key 150 of the depth stop member 134 is moved along the rotating helical flute 146 of the tube 110 until the depth stop member 134 is in the first position, such that the first, maximum, distance D1 is defined between the depth stop member 134 and the tooth 24 of the second bushing 180. The operator then repeats the stripping operation described above, concluding with gradual insertion of the second wire through the second bushing 180, which has an internal diameter that is nominally greater than the second wire. The second wire is inserted through the coupling member 18 and tube 110 until the second wire abuts against the depth stop member 134. As the second wire travels through the second bushing 180, coupling member 18 and into tube 110, the tooth 24 rotates about the insulated jacket of the second wire, thereby making a continuous helical cut that strips the jacket from the second wire. Once the wire has reached the depth stop member 134, the maximum length of the second wire has been stripped, and the operator may remove the second wire from the wire striper 10, which causes the stripped jacket portion to also fall out.

In some operations, an operator may wish to adjust the setting of the depth adjustment mechanism 106 during operation, in which case the operator simply turns the dial 142 while depressing the trigger 170. Because the tube 110 rotates relative to the depth stop member 134 and the drive member 46, the depth stop member 134 can therefore be adjusted on the fly during operation.

In some embodiments, the drive member 46 is omitted and instead, a belt drive mechanism is employed with a belt arranged about and engaged with the first bushing 22. In operation, the belt drive system is driven by the drive mechanism 26 to pull the belt about the first bushing 22, thereby rotating the first bushing 22 via friction. In other embodiments, the drive member 46 may remain but the ring gear 50 replaced by a pulley around which the belt may be arranged.

Figure 9:
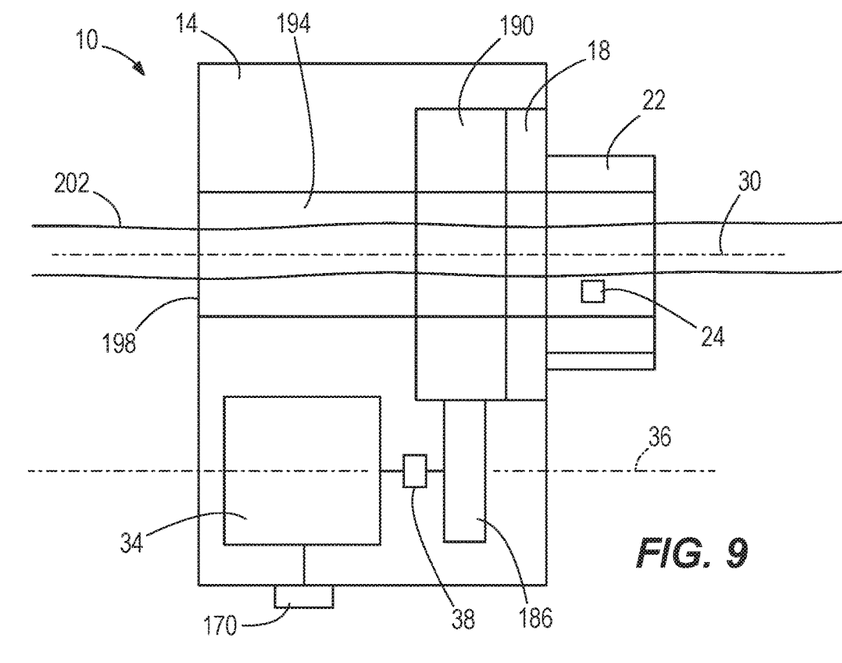
FIG. 9 is a schematic view of another embodiment of the wire stripper of FIG. 1.

FIG. 9 schematically shows an embodiment of the wire stripper 10 in which the rotation axis 36 of the motor 34 is parallel to the longitudinal axis 30. In the embodiment of FIG. 9, the motor 34, via the transmission 38, drives a gear, such as a spur gear 186, that is engaged with a drive member 190. The drive member 190 drives rotation of the coupling member 18, which receives the first bushing 22, in the same manner as the embodiment of FIGS. 1-8. In the embodiment of FIG. 9, the depth adjustment mechanism 106 is omitted and instead, the housing 14 includes a cavity 194 and an opening 198 on a side of the housing 14 opposite the first bushing 22 that provides access to the cavity 194.

In operation of the embodiment of FIG. 9, the operator then presses the switch 170, which activates the motor 34 to rotate the spur gear 186 via the transmission 38. Rotation of the spur gear 186 causes the drive member 190 to rotate the coupling member 18, which causes the first bushing 22 rotate. The operator then gradually inserts a wire 202 through the first bushing 22, the coupling member 18, the cavity 194, and the opening 198, such that the wire 202 passes through the housing 14 of the wire stripper 10. As the wire 202 travels through the first bushing 22, the tooth 24 rotates about the insulated jacket of the wire 202, thereby making a continuous helical cut that strips the jacket from the wire 202.

Because the wire 202 can pass through the wire stripper 10, the operator can make a longer cut along the wire 202 than in the embodiment of FIGS. 1-8, in which the length of the cut is limited by the depth adjustment mechanism 106. When the operator is satisfied with the length of wire 202 that has been stripped, the operator may then release the switch 170 and remove the wire 202 from the wire striper 10 in a direction opposite that it was inserted, such that the wire 202 passes back through the opening 198, the cavity 194, the coupling member 18, and the first bushing 22, causing the stripped jacket portion to also fall out.

Various features of the invention are set forth in the following claims.

What is claimed is:

1. A wire stripper comprising:
a housing;
a bushing coupled to the housing and having a tooth engageable with a wire for stripping an insulation jacket therefrom;
a drive mechanism configured to rotate the bushing about a longitudinal axis; and
a depth adjustment mechanism arranged in the housing along the longitudinal axis, the depth adjustment mechanism including a depth stop member and a telescoping shaft to which the depth stop member is coupled,
wherein the telescoping shaft is configured to telescope within the housing as the depth stop member moves between a first position, in which a first distance is defined between the depth stop member and the tooth, and a second position, in which a second distance is defined between the depth stop member and the tooth,
wherein the first distance is greater than the second distance, and
wherein the telescoping shaft includes a plurality of telescoping members configured to telescope within the housing as the depth stop member moves between the first position and the second position.

2. The wire stripper of claim 1, wherein the depth adjustment mechanism includes a tube in which the depth stop member and the telescoping shaft are arranged, and wherein rotation of the tube about the longitudinal axis is configured to move the depth stop member between the first and second positions.

3. The wire stripper of claim 2, wherein the depth adjustment mechanism includes a dial coupled for rotation with the tube, and wherein rotation of the dial is configured to rotate the tube, such that the depth stop member is movable between the first and second positions.

4. The wire stripper of claim 3, wherein the dial includes a first indicia indicating that the depth stop member is in the first position and a second indicia indicating that the depth stop member is in the second position.

5. The wire stripper of claim 3, wherein the dial includes detents configured to stop the dial at first and second rotational positions with respect to the housing, the first and second rotational positions respectively corresponding to the first and second positions of the depth stop member.

6. The wire stripper of claim 2, wherein the tube includes a helical flute and the depth stop member includes a key arranged in the flute, and wherein when the tube rotates about the longitudinal axis, the key moves within the flute to move the depth stop member between the first and second positions.

7. A wire stripper assembly comprising:
a first bushing for stripping a wire of a first size, the first bushing having a first color;
a second bushing for stripping a wire of a second size that is different than the first size, the second bushing having a second color that is different than the first color;
a chart indicating that the first color corresponds to the first size and the second color corresponds to the second size; and
a wire stripper including a housing and a drive mechanism, wherein the first bushing and the second bushing are alternately coupled to the housing for rotation by the drive mechanism, wherein each of the first and second bushings has a tooth engageable with a wire for stripping an insulation jacket therefrom.

8. The wire stripper assembly of claim 7, wherein the first bushing has a front face with the first color, and the second bushing has a front face with the second color.

9. The wire stripper assembly of claim 7, further comprising a depth adjustment mechanism arranged in the housing along the longitudinal axis, the depth adjustment mechanism including a depth stop member and a telescoping shaft to which the depth stop member is coupled, wherein the telescoping shaft is configured to telescope within the housing as the depth stop member moves between a first position, in which a first distance is defined between the depth stop member and the tooth of the selected one of the first or second bushings attached to the drive mechanism, and a second position, in which a second distance is defined between the depth stop member and the tooth of the selected one of the first or second bushings attached to the drive mechanism, and wherein the first distance is greater than the second distance.

10. A wire stripper comprising:
a housing;
a bushing coupled to the housing and having a tooth engageable with a wire for stripping an insulation jacket therefrom;
a drive mechanism configured to rotate the bushing about a longitudinal axis; and
a depth adjustment mechanism arranged in the housing along the longitudinal axis, the depth adjustment mechanism including a depth stop member and a telescoping shaft to which the depth stop member is coupled,
wherein the telescoping shaft is configured to telescope within the housing as the depth stop member moves between a first position, in which a first distance is defined between the depth stop member and the tooth, and a second position, in which a second distance is defined between the depth stop member and the tooth,
wherein the first distance is greater than the second distance, and
wherein the housing includes a coupling member that is rotatable about the longitudinal axis by the drive mechanism and configured to receive the bushing, the coupling member having a retainer that is moveable between a first position, in which the retainer is received in an aperture in the bushing to secure the bushing to the coupling member, such that the drive mechanism can rotate the coupling member and the busing about the longitudinal axis, and a second position, in which the bushing is removable from the coupling member.

11. A wire stripper comprising:
a housing;
a bushing coupled to the housing and having a tooth engageable with a wire for stripping an insulation jacket therefrom;
a drive mechanism configured to rotate the bushing about a longitudinal axis; and
a depth adjustment mechanism arranged in the housing along the longitudinal axis, the depth adjustment mechanism including a depth stop member and a telescoping shaft to which the depth stop member is coupled,
wherein the housing includes a coupling member that is rotatable about the longitudinal axis by the drive mechanism and configured to receive the bushing, the coupling member having a retainer that is moveable between a first position and second position,
wherein the telescoping shaft is configured to telescope within the housing as the depth stop member moves between a first position, in which a first distance is defined between the depth stop member and the tooth, and a second position, in which a second distance is defined between the depth stop member and the tooth,
wherein the first distance is greater than the second distance, and
wherein the bushing is a first bushing having a first internal diameter and a first indicia, wherein the wire stripper further comprises a second bushing having a second internal diameter that is different than the first internal diameter and a second indicia that is different from the first indicia, and wherein when the retainer is in the second position, the first bushing is removable from the housing and the second bushing is insertable into the housing.

12. The wire stripper of claim 10, further comprising a drive member that is rotatable about the longitudinal axis by the drive mechanism, the drive member including a collar that is coupled to the coupling member, such that the coupling member is coupled for rotation with the drive member, and wherein the bushing is receivable in the collar and the collar includes a bore through which the retainer extends when the retainer is in the first position.

13. The wire stripper of claim 10, further comprising an actuator configured to move the retainer from the first position to the second position.

14. The wire stripper of claim 13, wherein the retainer is biased toward the first position, and wherein the actuator pivots to move the retainer from the first position toward the second position.

15. The wire stripper of claim 11, further comprising a chart indicating that the first indicia corresponds to the first internal diameter and the second indicia corresponds to the second internal diameter.

* * * * *